United States Patent [19]
Nakamura et al.

[11] Patent Number: 5,692,287
[45] Date of Patent: Dec. 2, 1997

[54] METHOD OF MANUFACTURING A METAL POLYGON MIRROR

[75] Inventors: Koichi Nakamura, Toride; Takao Atsugi; Koichi Ohyoshi, both of Saitama-ken, all of Japan

[73] Assignee: Canon Kabushiki Kaisha, Tokyo, Japan

[21] Appl. No.: 536,846

[22] Filed: Sep. 29, 1995

[30] Foreign Application Priority Data

Oct. 4, 1994 [JP] Japan .................................. 6-240011
Sep. 25, 1995 [JP] Japan .................................. 7-245844

[51] Int. Cl.$^6$ .................................................. B23P 13/04
[52] U.S. Cl. .............................. 29/558; 359/217; 359/850
[58] Field of Search ............................ 29/558; 359/850, 359/217, 218

[56] References Cited

U.S. PATENT DOCUMENTS

| | | | |
|---|---|---|---|
| 4,768,861 | 9/1988 | Epner | 350/320 |
| 4,842,354 | 6/1989 | Takahashi et al. | 359/218 |
| 5,463,503 | 10/1995 | Kawada et al. | 359/850 |

FOREIGN PATENT DOCUMENTS

| | | |
|---|---|---|
| 58-223101 | 12/1983 | Japan . |
| 59-84217 | 5/1984 | Japan . |
| 61-133920 | 6/1986 | Japan . |
| 61-188516 | 8/1986 | Japan . |
| 62-205310 | 9/1987 | Japan . |
| 2149815 | 6/1990 | Japan . |
| 4-32815 | 2/1992 | Japan . |

OTHER PUBLICATIONS

IBM Technical Disclosure Bulletin, "Diamond Flycut Multifaceted Mirror", vol. 26, No. 2, pp. 559–560 (Jul. 1983).

*Primary Examiner*—David P. Bryant
*Attorney, Agent, or Firm*—Fitzpatrick, Cella, Harper & Scinto

[57] ABSTRACT

A metal mirror manufacturing method effectively uses the precision of a polygon mirror blank obtained by press working by omitting a peeling step, thereby improving the productivity. In order to achieve this object, there is provided a method of manufacturing a polygon mirror by finishing each surface of a metal mirror blank having undergone press working into a mirror surface by a cutting process, including the steps of cutting intersecting portions between the respective surfaces of the mirror blank by a cutting process by a predetermined amount, and flattening each of the surfaces by causing a mirror-working cutting tool to enter the mirror blank from a cut mark of each cut intersecting portion.

6 Claims, 9 Drawing Sheets

F I G. 2
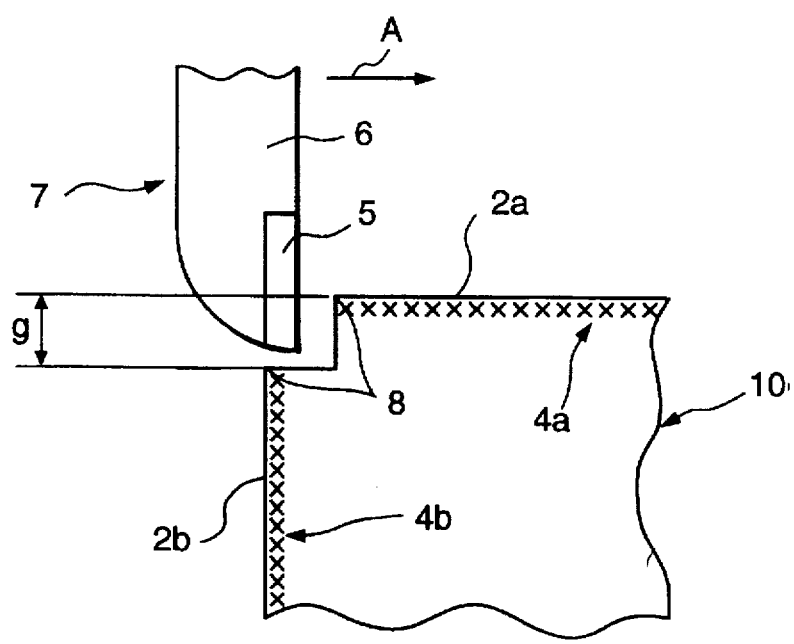

METHOD OF MANUFACTURING A METAL POLYGON MIRROR

BACKGROUND OF THE INVENTION

1. Field of the Invention

The present invention relates to a metal mirror such as a rotary mirror or a polygon mirror used for an image forming apparatus such as a laser printer and a method of manufacturing the same and, more particularly, to a method of improving the mirror-cutting properties of a sheared surface obtained when a product (to be referred to as a mirror blank hereinafter) to be flattened and finished into a mirror is manufactured by a shearing process such as press working.

2. Description of the Related Art

Conventionally, a polygon mirror is manufactured by the following method. First of all, a polygon mirror blank which is almost the completed shape of a polygon mirror is manufactured by a shearing process such as press working. The polygon mirror blank is then mirror-cut to complete a polygon mirror. If, however, a polygon mirror blank is manufactured by press working, the resultant surface to be mirror-cut becomes a pressed surface such as a shaved or forged surface. That is, the surface layer have undergone considerable work-hardening/change in quality. For this reason, even if annealing is performed, the cutting properties are poor, and surface irregularity and the like occur when a mirror-cutting process is directly performed. In order to prevent this, in a conventional method, a surface of a polygon mirror blank which is obtained by press working is subjected to entire surface peeling by a cutting process.

As described above, since the surface of a polygon mirror blank manufactured by press working, which is to be formed into a mirror surface has poor surface cutting properties, a peeling process is required as a pre-process for finish-cutting. This peeling process, however, demands high precision to ensure high precision for finish-cutting to be performed afterward, and hence a high-precision cutting machine is required for the peeling process. For this reason, the conventional process method has the following drawbacks.

(1) Even if high polygon mirror blank precision can be ensured with press working precision, the press working precision cannot be effectively used because a peeling process is required.

(2) In order to maintain high working precision required for a polygon mirror blank in a peeling process, tool abrasion management and machine precision management are required. For this reason, the machine operating efficiency cannot be improved.

(3) In order to guarantee working precision, the cutting speed is limited. For this reason, the working time cannot be shortened.

(4) A high-precision cutting machine is expensive but is poor in productivity and cannot properly cope with variations in production. More specifically, if an equipment investment is made in accordance with the maximum production, a decrease in production leads to an increase in depreciation cost, resulting in an increase in cost.

SUMMARY OF THE INVENTION

The present invention, therefore, has been made in consideration of the above problem, and has as its object to provide a metal mirror and a method of manufacturing the same, which can effectively use the precision of a polygon mirror blank obtained by press working by omitting a peeling step, thereby improving the productivity.

It is another object of the present invention to provide a metal mirror which can eliminate the adverse effects of a quality-changed/hardened surface layer in a cutting process for a mirror surface to be processed when the quality-changed/hardened surface layer is formed on the mirror surface to be processed which is formed when a polygon mirror blank having a polygonal flat shape is formed from a metal base member by a shearing process such as press working. It is still another object of the present invention to provide a method of manufacturing a metal mirror with excellent workability by providing working conditions which remove a hardened surface layer formed in a shearing process.

In order to solve the above problems and achieve the above objects, a metal mirror manufacturing method according to the first aspect of the present invention is characterized as follows.

There is provided a metal mirror manufacturing method of manufacturing a polygon mirror by finishing each surface of a metal mirror blank having undergone press working into a mirror surface by a cutting process, comprising the first step of cutting intersecting portions between the respective surfaces of the mirror blank by a cutting process by a predetermined amount, and the second step of flattening each of the surfaces by causing a mirror-working cutting tool to enter the mirror blank from a cut mark of each intersecting portion cut in the first step.

A metal mirror manufacturing method according to the second aspect of the present invention is characterized as follows.

There is provided a method of manufacturing a metal mirror for an image forming apparatus, comprising the working step of working a mirror blank having a plurality of mirror surfaces to be processed from a metal base member by a shearing process, the cutting step of cutting ridge portions as intersecting portions between the mirror surfaces to be processed of the mirror blank, and the finishing step of flattening the mirror surfaces to be processed by a cutting process from the cut intersecting portions.

A metal mirror manufacturing method according to the third aspect of the present invention is characterized as follows.

There is provided a method of manufacturing a metal mirror for an image forming apparatus, comprising the working step of forming a mirror blank from a metal base member, the mirror blank having a plurality of mirror surface to be processed between the upper and lower surfaces, the first cutting step of forming chamfered portions on ridge portions between the upper and lower surfaces and the mirror surface to be processed by a cutting process, the second cutting step of cutting the ridge portions as intersecting portions between the mirror surface to be processed, and the finishing step of flattening the mirror surface to be processed by a cutting process from the cut intersecting portions.

A metal mirror according to the first aspect of the present invention is characterized as follows.

There is provided a metal mirror, which has a plurality of mirror surfaces and is used for an image forming apparatus, that is manufactured by forming a mirror blank having a plurality of mirror surface to be processed from a metal base member by a shearing process, cutting ridge portions as intersecting portions between the mirror surface to be processed of the mirror blank, and flattening the mirror surface to be processed by a cutting process from the cut intersecting portions.

A metal mirror according to the second aspect of the present invention is characterized as follows.

There is provided a polygon metal mirror which has upper and lower surfaces and is used for an image forming apparatus and is manufactured by forming a mirror blank from a metal base member, the mirror blank having a plurality of mirror surface to be processed between the upper and lower surfaces, forming chamfered portions on ridge portions between the upper and lower surfaces and the mirror surface to be processed by a cutting process, cutting the ridge portions as intersecting portions between the mirror surface to be processed, and flattening the mirror surfaces to be processed by a cutting process from the cut intersecting portions.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such examples, however, is not exhaustive of the various embodiments of the invention, and therefore reference is made to the claims which follows the description for determining the scope of the invention.

BRIEF DESCRIPTION OF THE DRAWINGS

FIG. 2 is a view showing the manner in which a mirror-working cutting tool enters a press-worked surface in a method to which an embodiment of the present invention is applied;

DETAILED DESCRIPTION OF THE PREFERRED EMBODIMENTS

A preferred embodiment of the present invention will be described in detail below with reference to the accompanying drawings.

Prior to a description of an embodiment of the present invention, a case wherein a finishing process is performed in a conventional process for a metal polygon mirror without performing a peeling process will be described below.

Figure 1:
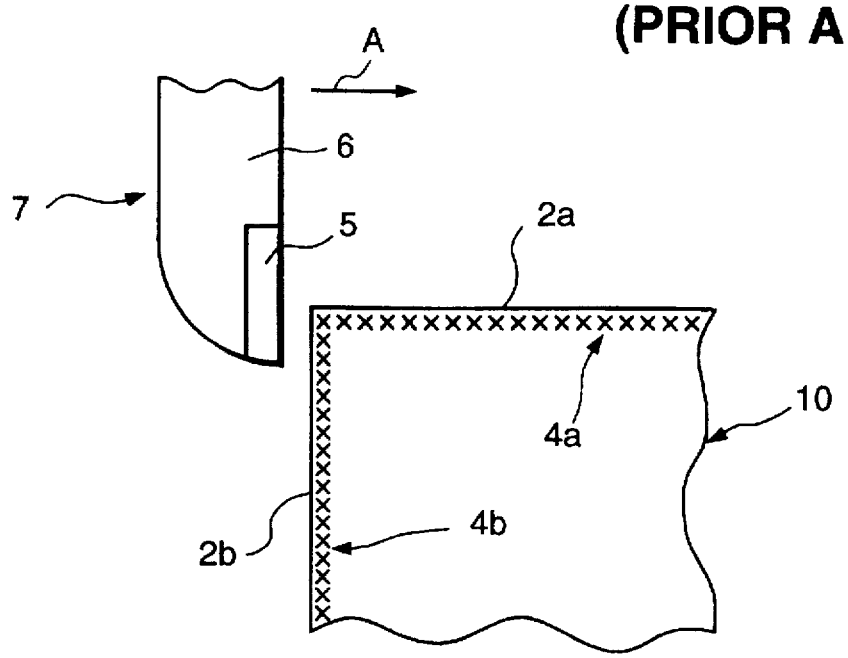
FIG. 1 is a view showing the manner in which a mirror-working cutting tool enters a press-worked surface in a conventional method.

FIG. 1 shows the manner in which a mirror-working cutting tool 7 enters a press-worked surface 2a to be formed into a mirror when a press-worked polygon mirror blank 10 is to be mirror-worked by a conventional method. The mirror-working cutting tool 7 is designed such that a single-crystal diamond tip 5 is bonded to a distal end portion of a cutting tool shank 6. Referring to FIG. 1, as described above, since no peeling process is performed for the press-worked polygon mirror blank 10, quality-changed/hardened surface layers 4a and 4b produced by press working are formed on the surface layer of the blank 10.

In the conventional method, when the press-worked polygon mirror blank 10 is to be mirror-cut, the single-crystal diamond tip 5 enters the press-worked surface 2a to be formed into a mirror from a press-worked surface 2b, as indicated by an arrow A in FIG. 1. Upon cutting off the quality-changed/hardened surface layer 4b, the single-crystal diamond tip 5 processes the press-worked surface 2a to be formed into a mirror. For this reason, the mirror-working cutting tool 7 supported by an air spindle having relatively low rigidity produces small vibrations upon cutting off the press-worked surface 2b. As a result, the kerf (the cut edge surface) is disturbed. Once vibrations are produced, the vibrations are not easily removed. For this reason, the vibrations of the mirror-working cutting tool 7 affect a process or the press-worked surface 2a. In addition, the quality-changed/hardened surface layer 4b on the surface layer material tends to attach to the single-crystal diamond tip 5. If a deposit is produced on the edge of the single-crystal diamond tip 5, the processed surface is damaged.

FIG. 2 shows the manner in which a mirror-working cutting tool 7 enters a press-worked surface 2a to be formed into a mirror when an embodiment of the present invention is applied. Referring to FIG. 2, reference numerals 2a and 2b denote press-worked surfaces; 4a and 4b, quality-changed/hardened surface layers; 5, a single-crystal diamond tip; 6, a cutting tool shank; and 7, a mirror-working cutting tool constituted by the single-crystal diamond tip 5 and the cutting tool shank 6. An arrow A indicates the moving direction of the mirror-working cutting tool 7.

As shown in FIG. 2, in this embodiment, an intersecting portion between the press-worked surfaces 2a and 2b is cut to expose a material inside the quality-changed/hardened surface layer so as to form an exposed portion 8. The exposed portion 8 is formed on a polygon mirror blank 10 by a cutting process before the press-worked surface 2a is worked with the mirror-working cutting tool 7. With this operation, the shock of the entrance of the mirror-working cutting tool 7 into the press-worked surface 2a can be reduced. In addition, since the edge of the single-crystal diamond tip 5 does not come into contact with the quality-changed/hardened surface layer 4b, a quality-changed/hardened substance will not be attached to the single-crystal diamond tip 5. The removal amount of the quality-changed/hardened surface layers 4a and 4b (the depth of the exposed portion 8) may be set such that a dimension g in FIG. 2 is larger than a cutting margin in a mirror-cutting process. In general, however, the removal amount must be set to be 0.03 mm or more in consideration of the machine precision of a mirror-cutting machine and blank precision. In order to set the removal amount of quality-changed/hardened surface layer to be 0.03 mm or less, the precision of the working machine must be considerably increased. With a removal amount of 0.5 mm or more, if a quality-changed/hardened surface layer is removed by performing one cutting, problems are posed in terms of the rigidity and clamping force of the work, the durability of the tool, the rigidity of the machine, and the like. For this reason, working must be performed twice or more. In consideration of the working efficiency, therefore, the removal amount is preferably set to be 0.03 mm to 0.5 mm. Note that the roughness of the surface of each exposed portion 8 is set to be 6.3 S or less, i.e., Rmax=6.3µm, in this embodiment.

In this manner, a portion, of the press-worked surface 2a to be formed into a mirror surface, which the mirror-working cutting tool 7 enters, i.e., an intersection portion as a ridge portion between the press-worked surfaces 2a and 2b, is removed by cutting, grinding, or the like by a depth of 0.03 mm or more. The mirror-working cutting tool 7 is then caused to enter the resultant portion of the press-worked surface 2a of the polygon mirror blank 10. With this process, the mirror-cutting efficiency can be improved. The pressed surface to be formed into a mirror therefore need not be subjected to an entire surface peeling process unlike the conventional scheme, thereby allowing effective use of the surface precision of press working. Note that the roughness of a mirror surface having undergone mirror working is set to be Rmax=0.05µm in this embodiment.

A detailed example of the formation of the exposed portions 8 on the polygon mirror blank 10 will be described next.

Figure 3:
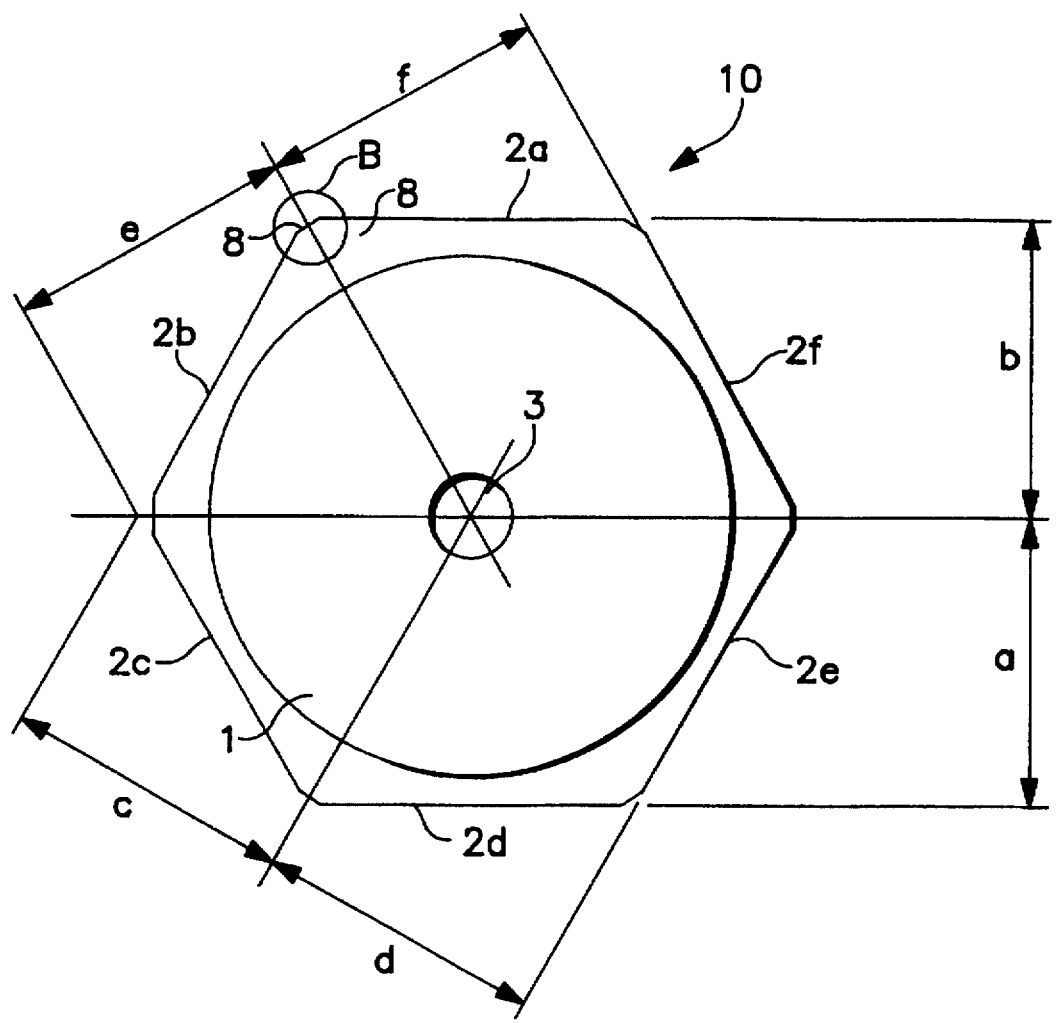
FIG. 3 is a view showing a state wherein an exposed portion is formed on a polygon mirror blank manufactured by press working.
Figure 4:
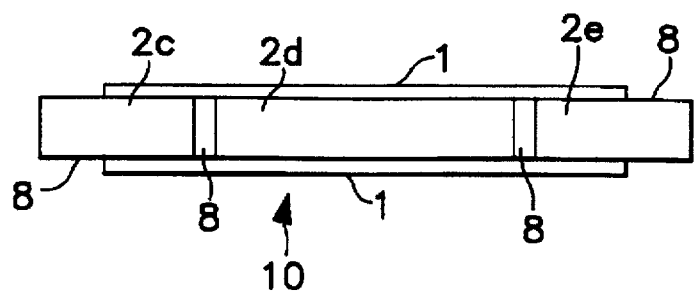
FIG. 4 is a side view showing the mirror blank in FIG. 3 when viewed from below.
Figure 5:
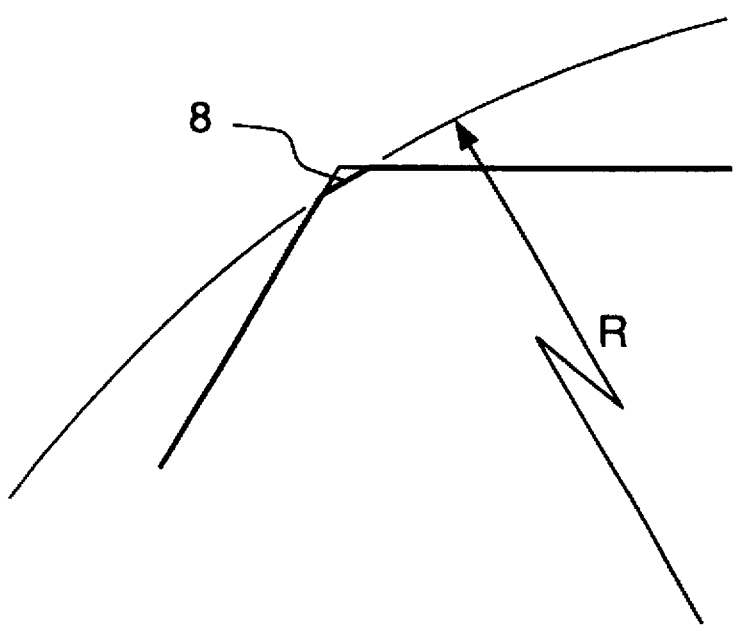
FIG. 5 is an enlarged view of a portion B in FIG. 3.

FIG. 3 shows a state wherein the exposed portions 8 are formed on the polygon mirror blank 10 manufactured by press working. FIG. 4 is a side view showing the polygon mirror blank 10 in FIG. 3 when viewed from below. Referring to FIGS. 3 and 4, reference numeral 1 denotes a forged or rolled surface of the polygon mirror blank 10; 2a to 2f, press-worked surfaces formed by a forging or shaving process, which surfaces are formed into mirror surfaces in the subsequent mirror-cutting process; and 3, a reference hole formed in the press-worked polygon mirror blank 10. Reference symbols a, b, c, d, e, and f denote dimensions from the central position of the reference hole 3 formed in the center of the press-worked polygon mirror blank 10. FIG. 5 is an enlarged view of a portion B in FIG. 3.

Figure 6:
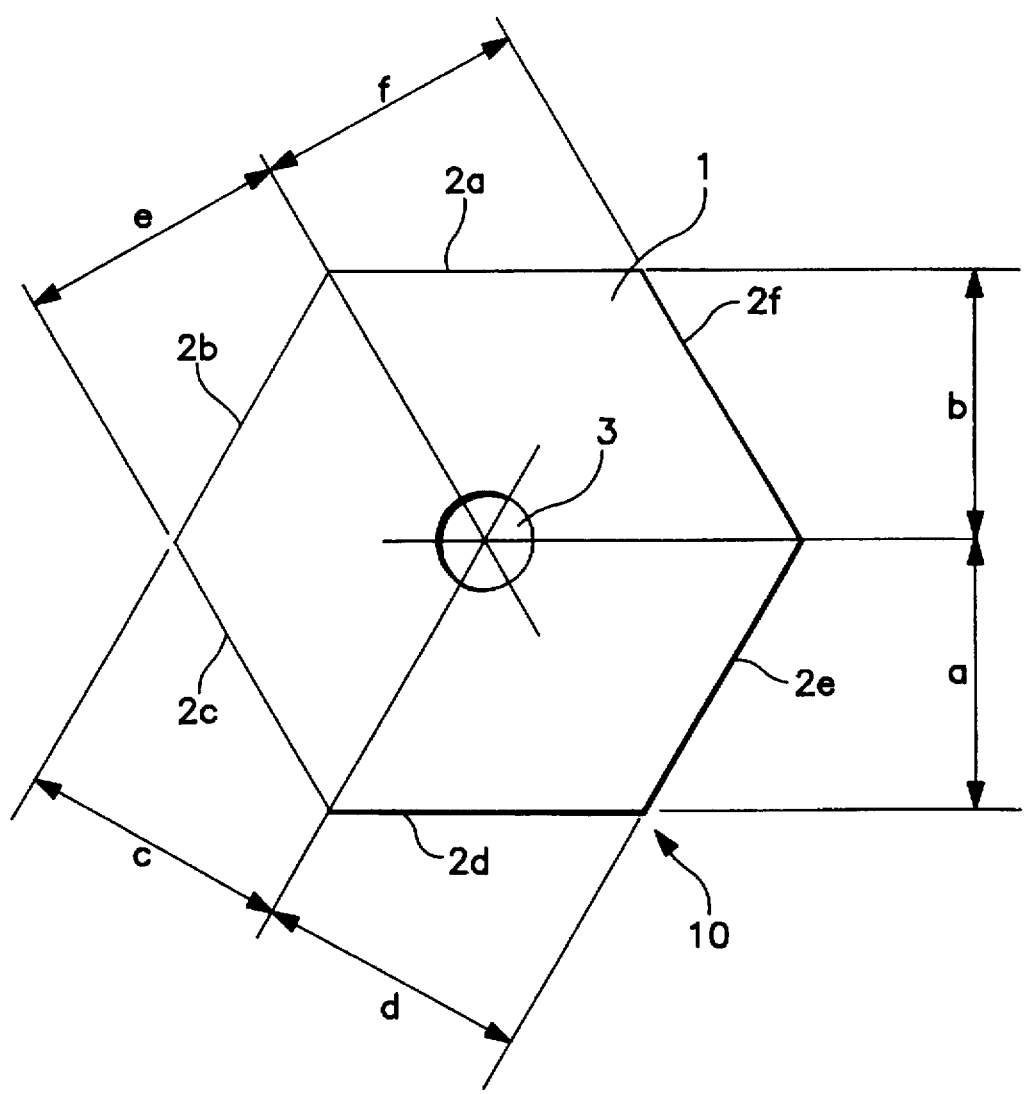
FIG. 6 is a view showing the shape of a polygon mirror blank having undergone a press working step using a pressure generating unit and a die.
Figure 7:
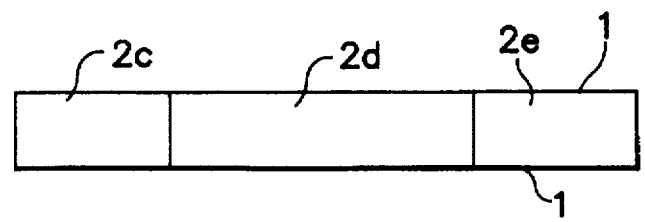
FIG. 7 is a side view showing the mirror blank in FIG. 6 when viewed from below.

FIG. 6 shows the shape of the polygon mirror blank having undergone a press working process using a pressure generating unit and a die. This blank is manufactured by working an aluminum plate or rod member using a press or a cutting machine. FIG. 7 is a side view of the polygon mirror blank in FIG. 6 when viewed from below. After this press working, the polygon mirror blank 10 works with high precision to prevent the remains and irregular margins.

FIG. 3 shows a shape obtained by cutting the polygon mirror blank 10 in FIG. 6, which has undergone such press working, in such a manner that ridge portions between the forged or rolled surface 1 of the material and the press-worked surfaces 2a to 2f and ridge portions between the press-worked surfaces 2a to 2f are cut by a depth of 0.03 mm or more.

In cutting the blank in FIG. 6 into the blank in FIG. 3, the reference hole 3 formed in the center of the polygon mirror blank 10 is chucked on a lathe, and the ridge portions between the forged or rolled surface 1 and the press-worked surfaces 2a to 2f are cut by a depth of 0.03 mm or more so as to form the blank into the shape shown in FIG. 3. In addition, each of the ridge portions between the press-worked surfaces 2a to 2f is cut from the top by a depth of 0.03 mm or more in the shape of "R" shown in FIG. 5. By setting the polygon mirror blank 10, manufactured by a press working process, on the lathe only once in this manner, the 18 ridge portions between the press-worked surfaces 2a to 2f can be peeled. The peeled portions become the exposed portions 8.

Note that an etching method can be applied to a method of detecting the presence of the quality-changed/hardened surface layers 4a and 4b.

First of all, a surface to be etched is subjected to mirror-cutting or mirror-lapping. The resultant surface is then dipped into an about 10% aqueous hydrogen fluoride solution for about 25 seconds, and the manner in which the surface is roughened in the process of etching is observed. A portion having a composition different from that of the base member is roughened because of a difference in etching rate. When a quality-changed/hardened surface layer is observed with a microscope, a sandy portion is observed near the surface layer. With this operation, the presence of the quality-changed/hardened surface layer can be checked.

When the polygon mirror blank 10 obtained by peeling/cutting the ridge portions between the press-worked surfaces 2a to 2f in FIG. 3 is to be mirror-cut, the mirror-working cutting tool 7 always enters the press-worked surfaces 2a to 2f from the portions where the material surfaces are exposed by the peeling/cutting process. Since the mirror-working cutting tool 7 enters from a material surface, the shock at the start of cutting is reduced, and the vibrations of the mirror-working cutting tool 7 are suppressed. In addition, since the mirror-working cutting tool 7 is not brought into contact with any quality-changed/hardened surface layer produced upon press working, a quality-changed/hardened substance will not be attached to the mirror-working cutting tool 7. With these effects, the mirror-cutting process can be greatly improved.

Figure 8:
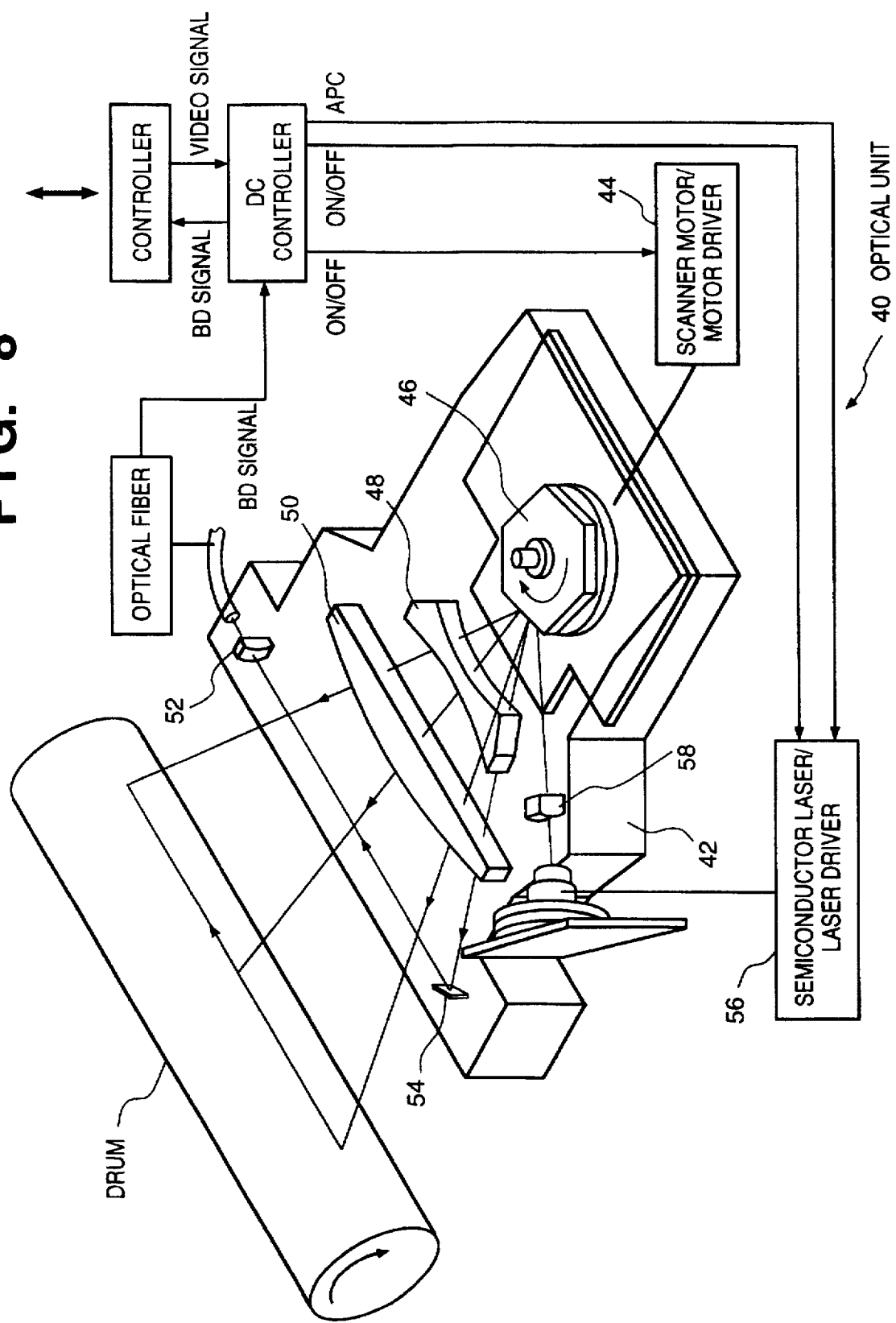
FIG. 8 is a view for explaining the optical unit of an image forming apparatus having a manufactured polygon mirror.

FIG. 8 is a view for explaining the main part of the optical unit of an image forming apparatus having a polygon mirror 46 manufactured in the above manner.

An optical unit 40 comprises a scanner motor/motor driver 44, the polygon mirror 46, a toric lens 50, a horizontal synchronization (BD) lens 52, a BD mirror 54, a semiconductor laser/laser driver 56, a cylindrical lens 58, an optical unit holding member 42 for housing these parts and units, and the like.

The optical unit 40 in FIG. 8 is designed to scan a laser beam from the semiconductor laser/laser driver 56 onto a photosensitive drum through the spherical lens 48 and the toric lens 50 by rotating the polygon mirror 46.

Figure 9:
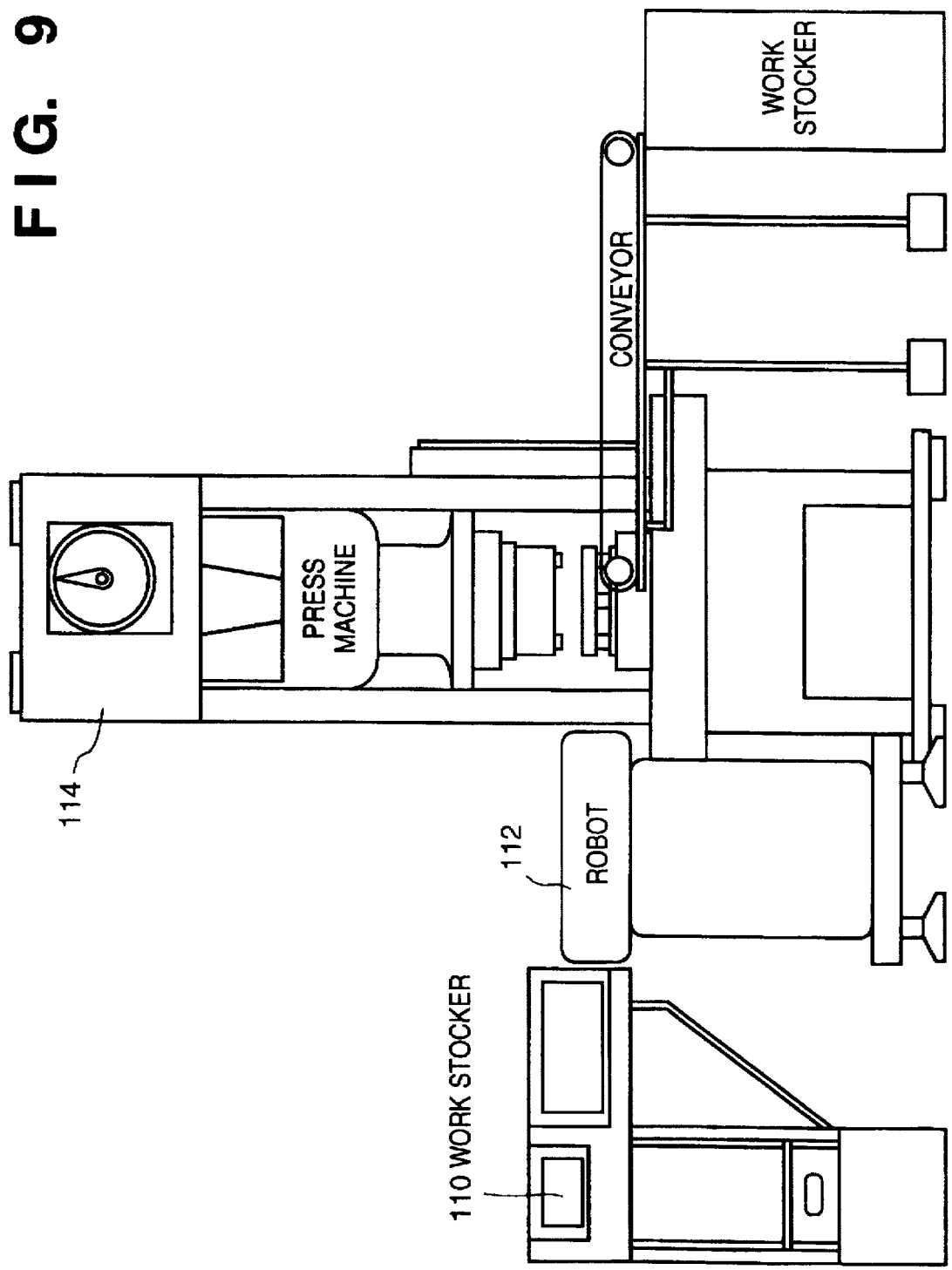
FIG. 9 is a schematic view showing an apparatus for manufacturing a polygon mirror blank by blanking.

FIG. 9 is a schematic view showing an apparatus for manufacturing a polygon mirror blank by blanking.

Referring to FIG. 9, works to be press-worked are stored in a supply side work stocker 110. A robot 112 takes out a processed work from a die mounted on a press machine 114, and discharges it onto a conveyor. At the same time, the robot 112 supplies a work, taken out from the supply side work stocker, to the die. The processed work discharged onto the conveyor is conveyed on the conveyor to be stored in a discharge side work stocker. A polygon mirror blank like the one shown in FIG. 6 is manufactured by operating a press machine having such an arrangement, in which a die for each step is mounted.

Figure 10:
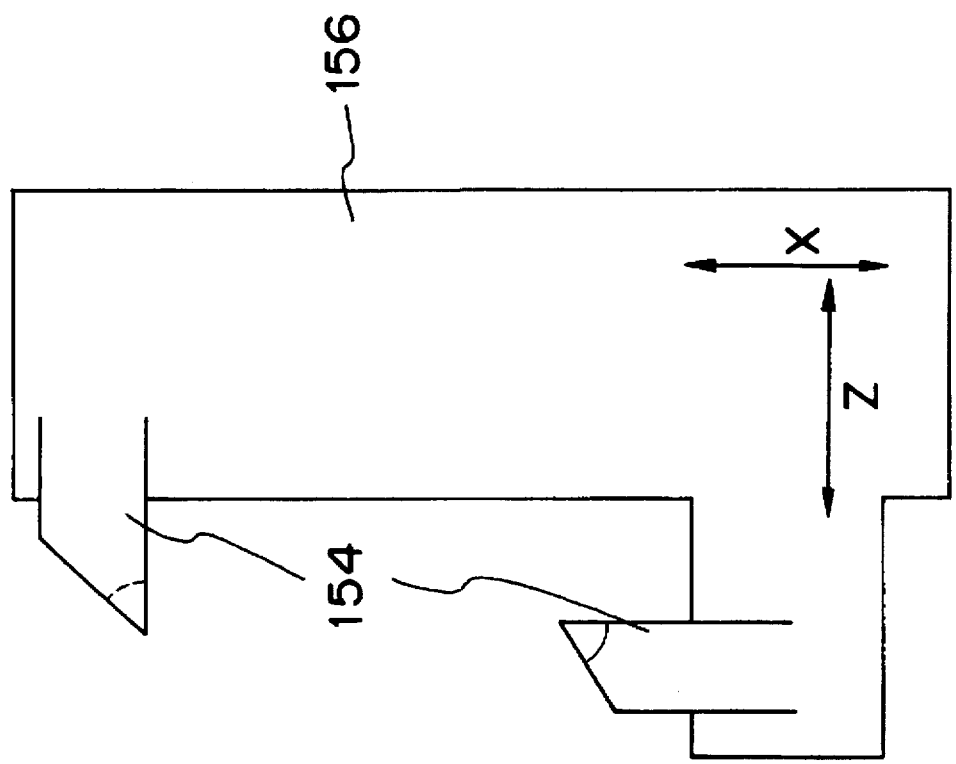
FIG. 10 is a schematic view showing the structure of a working machine for working exposed portions on a polygon mirror blank.
Figure 10:
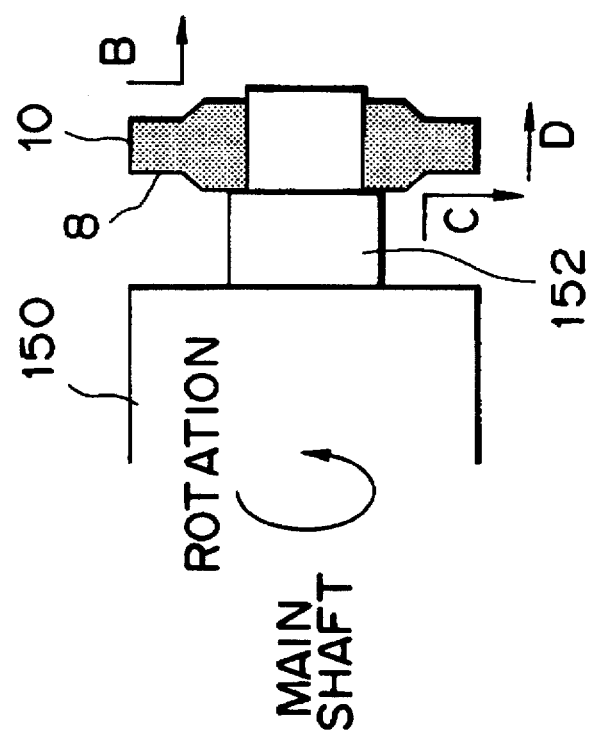

FIG. 10 is a schematic view showing the structure of a working machine for working the exposed portions 8 of the polygon mirror blank 10.

This working machine is constituted by a chuck and an NC lathe with a cutting tool. While the polygon mirror blank 10 mounted on a rotating spindle 150 through a chuck 152 is rotated, a table 156 on which a cutting tool 154 is mounted is moved in the X and Z directions to cut the ridge portions of the polygon mirror blank 10. In this case, the cutting tool 154 is moved as indicated by an arrow B to work the upper surface of the blank 10, and is moved as indicated by an arrow C to work the lower surface of the blank 10. The cutting tool 154 is also moved as indicated by an arrow D to work the outer shape of the blank 10. In this manner, the exposed portions 8 are formed on the polygon mirror blank 10. Note that the mirror surface of the polygon mirror blank 10 is worked by a known cutting machine. (Other Embodiments)

Figure 11:
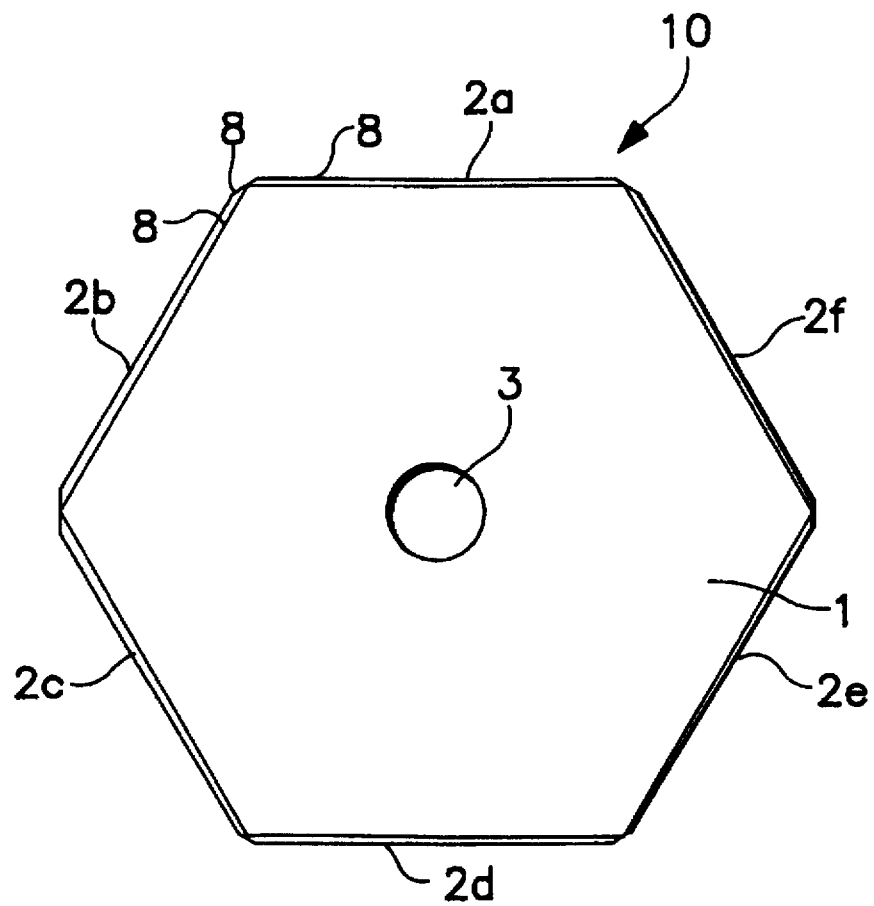
FIG. 11 is a view showing another embodiment in which exposed portions are formed on a polygon mirror blank.
Figure 12:
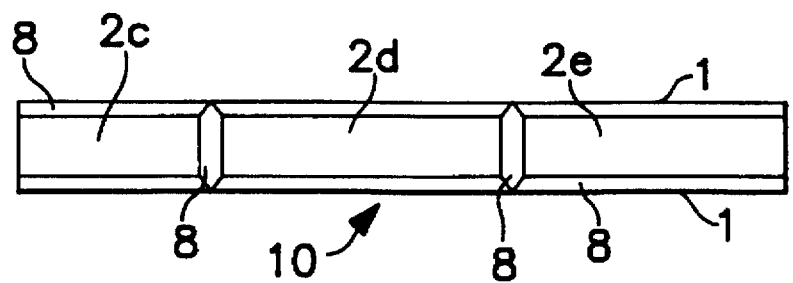
FIG. 12 is a side view showing the mirror blank in FIG. 11 when viewed from below.

FIG. 11 shows another embodiment in which exposed portions 8 are formed on a polygon mirror blank 10. FIG. 12 is a side view showing the polygon mirror blank 10 in FIG. 11 when viewed from below. In this embodiment, 18 ridge portions in which press-worked surfaces $2a$ to $2f$ of the polygon mirror blank 10 having undergone press working are contact are C-chamfered. With this process as well, since a mirror-working cutting tool 7 enters from the material surface in mirror-cutting each of the press-worked surfaces $2a$ to $2f$, the mirror-cutting efficiency is greatly improved.

Figure 13:
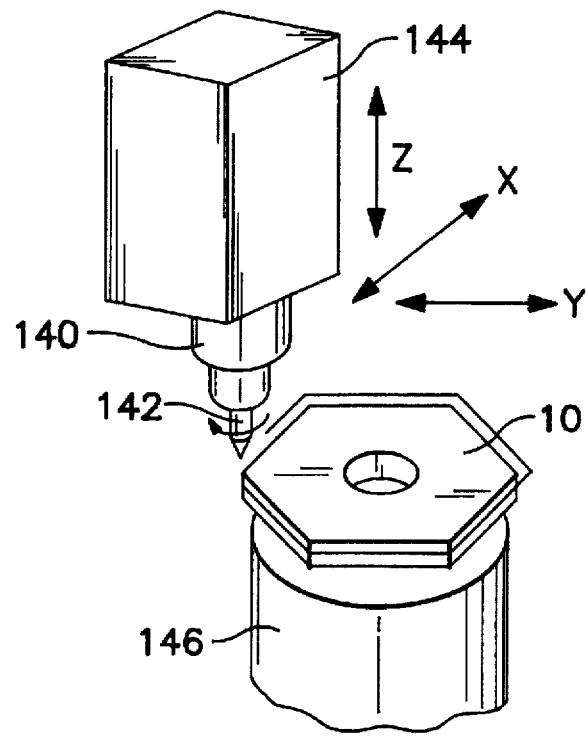
FIG. 13 is a schematic view showing the structure of a working machine for working exposed portions on a polygon mirror blank according to still another embodiment.

FIG. 13 is a schematic view showing the structure of a working machine for working the exposed portions of a polygon mirror blank 10 according to still another embodiment.

Figure 14:
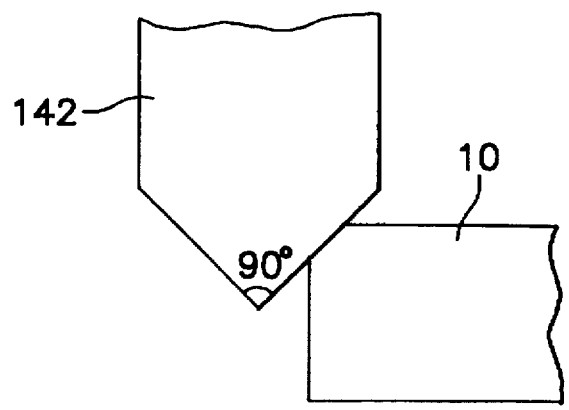
FIG. 14 is an enlarge view of a rotary tool.

This working machine is constituted by a machining center or an NC milling machine. While a rotating tool (end mill) 142 mounted on a rotating spindle 140 is rotated, a spindle driving mechanism 144 is moved in the X, Y, and Z directions to cut the ridge portions of a polygon mirror blank 10 fixed to a clamping jig 146. FIG. 14 is an enlarged view of the rotary tool. The distal end portion of the rotary tool is formed into a conical shape having a vertical angle of 90°. As shown in FIG. 14, the rotary tool is brought into contact with the polygon mirror blank 10 to chamfer each ridge portion at 45°.

The portions to be formed into mirror surfaces are worked in the same manner as in the above embodiment.

As described above, with the use of the simple process of exposing a material surface by performing a cutting or grinding process for only a small area, of each press-worked surface formed by mirror-cutting with a required surface precision, which the mirror-cutting tool enters, a mirror surface can be directly obtained by a mirror-cutting process. The following effects therefore can be obtained.

(1) In the conventional scheme, when an entire surface to be formed into a mirror is to be cut while the surface precision (surface roughness, parallelism, opposing surface distance, squareness with respect to a reference axis, and adjacent surface angle) required for a mirror-cutting process is satisfied, the cutting speed is limited to about 800 mm/min. In contrast to this, in the above embodiments, the biting amount is small because each ridge portion only needs to be slightly peeled, and the allowable range of precision is large, i.e., the range of depth of 0.03 mm or more to 0.5 mm or less. For this reason, a cutting speed of about 4,000 mm/min can be attained, and the number of steps can be reduced to ⅕ that in the conventional scheme.

The cutting speed will be described below. The above cutting speed is accurately defined as a cutting feed speed. A cutting speed of 4,000 mm/min indicates that the cutting feed speed in an end mill process is 4,000 mm/min. The cutting feed speed of the end mill is determined by the number (n) of blades of the tool, the feed amount (l) per blade, and the rotational speed (S) of the spindle. The feed speed (F) is given by $$F = n \times l \times s$$

The parameters n, l, and S for determining this feed speed are determined as follows.

The number of blades of the tool is determined by the tool cost, the maximum rotational speed of the spindle of the machine to be operated, the maximum cutting feed speed, and the feed amount per blade. The feed amount per blade is determined by using a standard cutting condition table on the basis of the material to be cut, the tool, the cutout amount, and the cutout width. The rotational speed is determined in accordance with the optional cutting speed determined by the material to be cut and the tool.

In practice, however, when the material to be cut is aluminum, these parameters are determined by the performance of the machine to be operated. If, for example, the tool is made of diamond, the cutting speed is 500 m/min or more. If the tool diameter is 20 mm, the rotational speed is 7,962 rpm or more. In this case, if the maximum rotational speed of the machine is 8,000 rpm, the rotational speed of the spindle is 8,000 rpm. If, therefore, the feed amount per blade is set to be 0.1 mm, the cutting feed speed of the machine having four blades is given by $$F = n \times l \times S = 4 \times 0.1 \times 8,000 = 3,200 \ (mm/min)$$

The feed amount per blade is set to attain a required surface roughness. This setting is based on the rigidity of the machine, the deflection tolerance of the spindle, the rotational vibrations, and the blade rigidity. Even with the same tool and processes under the same conditions, the surface roughness varies depending on the machine to be operated. For this reason, in practice, the cutting feed speed is determined depending on the machine to be operated.

In this embodiment, if the cutting speed is determined in consideration of these points, a high cutting speed of about 4,000 mm/min can be attained by using a four-blade end mill with a spindle rotational speed of 12,500 rpm and a feed amount of 0.08 mm per blade.

(2) In the conventional scheme, when a surface to be formed into a mirror is to be subjected to an entire surface cutting process, the surface precision required for a mirror-cutting process must be maintained in the entire surface cutting process as well. For this reason, a high-precision cutting machine is required. In the above embodiments, however, since the surface tolerance obtained by press working can be effectively used, a high-precision cutting machine is not required. Although a working machine for peeling ridge portions is required instead, the equipment cost per machine is ⅔ or less of that of a high-precision cutting machine. In addition, as described in item (1), since the production capacity is five times that of the high-precision cutting machine, the investment in plant and equipment can be reduced to ½ or less. Variations in depreciation cost due to variations in production therefore are much smaller than those in the conventional scheme.

(3) The dimension g in FIG. 2 is the peeling depth of each ridge portion on a mirror surface, and remains the same in a chamfering process. This peeling depth or the chamfering amount needs to be several tens μm or more in consideration of a margin in a mirror-cutting process. The upper limit is determined by the width × the length of a press-worked surface to be formed into a mirror and the width × the length of an effective mirror surface required after mirror working. In order to save a material cost, the differences in width and length between the two surfaces are set to be 1 mm or less. For this reason, the upper limit of the peeling depth or the chamfering amount is 0.5 mm or less. Since the peeling depth or the chamfering amount may be controlled to be 0.2 mm±0.15 mm in a manufacturing process, the necessary working tolerance can be easily maintained. In a peeling process using an entire surface cutting process in the conventional scheme, a manufacturing tolerance of ±0.01 mm must be maintained, and hence tool abrasion management and machine tolerance management are time-consuming processing. For this reason, a machine operating efficiency of 85% or more cannot be attained. According to the above embodiments, however, a machine operating efficiency of 95% or more can be attained.

As described above, according to the above embodiments, the simple process of cutting the ridge portions of the respective press-worked surfaces is additionally performed for a polygon mirror blank having undergone high-precision press working. With this simple process, the mirror-cutting properties of each press-worked surface to be formed into a mirror surface can be greatly improved.

Various changes and modifications of the above embodiment can be made without departing from the spirit and scope of the invention.

For example, the above embodiments have exemplified the polygon mirrors having six surfaces. However, the present invention can be applied to other polygon mirrors to obtain the same effects as those described above by peeling the ridge portions of surfaces to be formed into mirror surfaces in the same manner as described above.

As has been described above, according to the metal mirror and the method of manufacturing the same of the present invention, in the first step, each intersecting portion between surfaces, of a mirror blank, which are to be finished into mirror surfaces are cut off to expose a material portion having undergone no work-hardening nor change in quality. In the second step, the mirror-working cutting tool enters from the exposed portion to perform mirror working, thereby preventing the mirror-working cutting tool from cutting a portion having undergone work-hardening or a change in quality when the tool enters the polygon mirror blank. With this operation, abrasion of the mirror-working cutting tool and a degradation in cutting efficiency can be prevented. For this reason, a peeling process in the conventional scheme can be omitted, and the working precision of the polygon mirror blank manufactured by press working can be effectively utilized. In addition, the productivity can be improved.

Furthermore, by cutting each ridge portion between surfaces to be subjected to mirror working by a depth of 0.03 mm or more, a portion having undergone work-hardening or a change in quality upon press working can be reliably cut off to reliably expose a material portion.

The present invention is not limited to the above embodiments and various changes and modifications can be made within the spirit and scope of the present invention. Therefore, to apprise the public of the scope of the present invention the following claims are made..

What is claimed is:

1. A method of manufacturing a metal polygon mirror comprising the steps of:

forming a mirror blank from a metal base material by a shearing process so as to produce a modified surface layer of the mirror blank having different mechanical properties than the rest of the mirror blank;

cutting ridge portions between adjacent surfaces of the mirror blank to form a kerf by cutting into the mirror blank by a predetermined amount such that the corresponding portion of the modified surface is completely removed inside the kerf; and finishing each of the adjacent surfaces with a mirror-working cutting tool that enters the mirror blank at a cut edge where the ridge portion was cut away.

2. The method according to claim 1, wherein the predetermined amount is a depth of not less than 0.03 mm.

3. A method according to claim 1, wherein a surface roughness of each cut edge surface and mirror blank surface is set to be 6.3 µ or less.

4. A method according to claim 1, further comprising the step of forming chamfered portions on ridge portions formed between upper and lower surfaces of the mirror blank and the mirror surfaces by a cutting process.

5. A method of manufacturing a metal mirror for an image forming apparatus, comprising the steps of:

forming a mirror blank having a plurality of mirror surfaces to be processed from a metal base material by a shearing process;

cutting ridge portions at intersecting portions between the mirror surfaces of the mirror blank; and flattening the mirror surfaces to be processed by a cutting process with a working tool at a cut edge where a ridge portion was cut away.

6. A method of manufacturing a metal mirror for an image forming apparatus, comprising the steps of:

forming a mirror blank from a metal base material, the mirror blank having upper and lower surfaces and a plurality of mirror surfaces therebetween to be processed;

forming chamfered portions on ridge portions between the upper and lower surfaces and the mirror surfaces to be processed by a cutting process;

cutting ridge portions between adjacent surfaces of the mirror blank to form a kerf by cutting; and flattening the mirror surfaces to be processed by a cutting process with a working tool at a cut edge where a ridge portion was cut away.

* * * * *